United States Patent

[11] 3,578,826

[72] Inventor  Kasimir Janiszewski
              5426 W. Andover Road, Milwaukee, Wis. 53219
[21] Appl. No. 860,370
[22] Filed     Sept. 23, 1969
[45] Patented  May 18, 1971

[54] OILER BUSHING
     9 Claims, 3 Drawing Figs.
[52] U.S. Cl. .................................................. 308/4,
                                              308/5, 308/171
[51] Int. Cl. ..................................................... F16c 17/00,
                                                          F16c 33/10
[50] Field of Search........................................ 308/240,
     171, 5, 4 (A), 4 (C); 184/5, 100, 102; 164/118

[56]              References Cited
            UNITED STATES PATENTS
2,225,145   12/1940   Baumbach..................  308/5
2,406,891    9/1946   Newton et al................  308/171X
3,235,317    2/1966   Cunningham................  308/171X Primary Examiner—Fred C. Mattern, Jr.
Assistant Examiner—B. L. Grossman
Attorney—Wheeler, House and Wheeler ABSTRACT: A conventional bushing has an oiler extension of very slightly increased interior diameter attached to it by a sleeve having pressed-fit connection externally with the bushing and extension. The oiler section is spool shaped, providing an oil-retaining well between it and the sleeve, and it has a shoulder proximate the bushing to seat an annular wick which has extensions downwardly into the well. Both the bushing and this extension are hardened and the bushing provides an extremely tight fit upon the leader pin, the pin being guided by the extension in entering the bushing.

PATENTED MAY 18 1971

3,578,826

INVENTOR
KASIMIR JANISZEWSKI

BY Wheeler, Wheeler, House & Clemency
ATTORNEYS

OILER BUSHING

BACKGROUND OF INVENTION

The assembly has the advantage of providing in one structure features which have not heretofore existed in one simple and relatively inexpensive combination.

SUMMARY OF INVENTION

The spool-shaped extension not only cooperates with the sleeve but provides a well for lubricant and guides the pin into an unusually close fit in the main bushing. Dirt and chips are excluded, thereby minimizing scored pins and galling. The wick and its legs extending into the oil reservoir can readily be stamped from a single flat piece of wicking material and will withdraw and apply to the pin lubricant from said well, the well containing enough for one or more days of operation.

DETAILED DESCRIPTION

Figure 1:
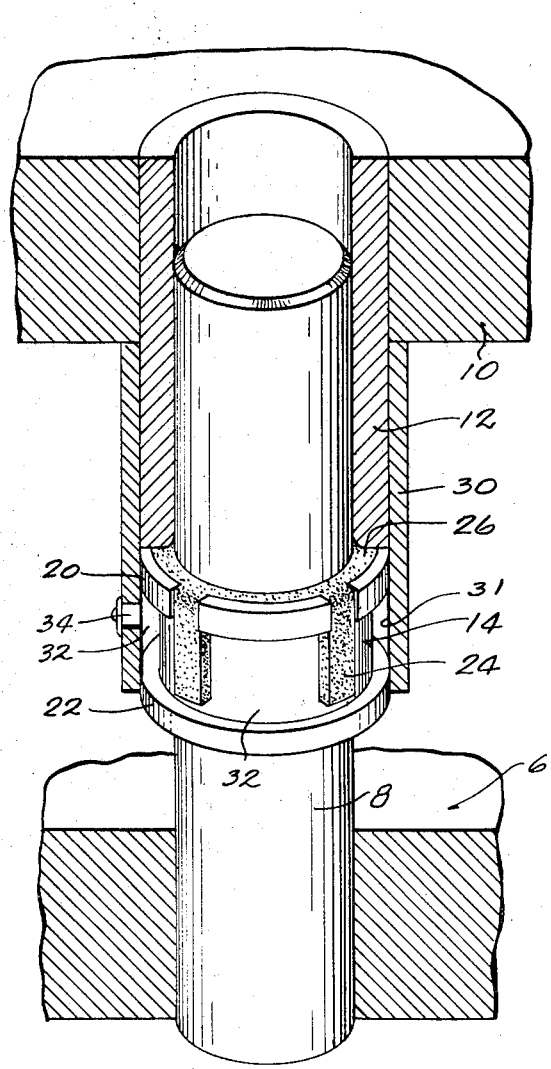
FIG. 1 is a view in side elevation, with parts broken away, showing a die set assembly incorporating the guide pin and bushing embodying the invention.
Figure 2:
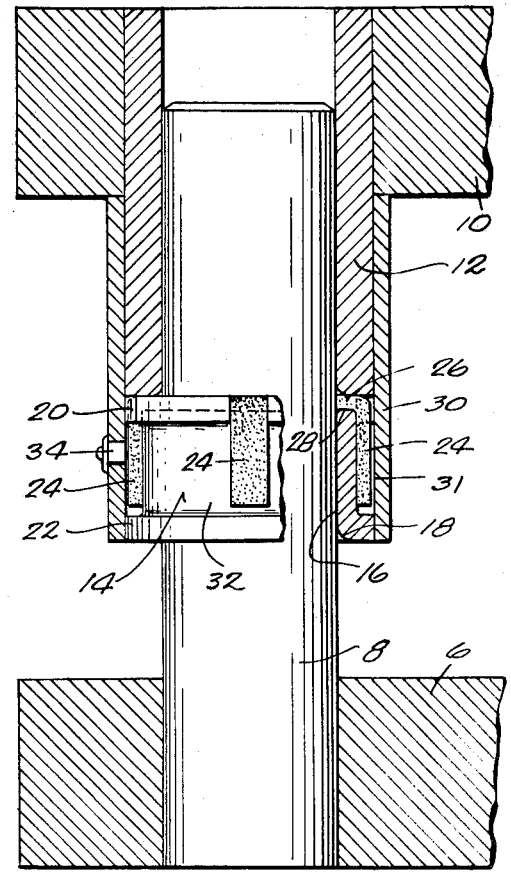
FIG. 2 is a view in cross section fragmentarily illustrating the main bushing and oiler section and connecting sleeve, parts of the oiler section being shown in side elevation.
Figure 3:
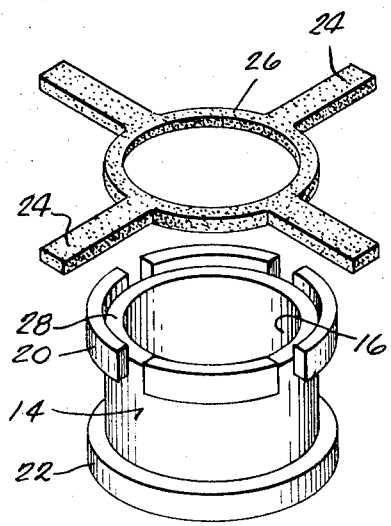
FIG. 3 is a view in perspective of a typical wick and a typical bushing extension, these being illustrated in slightly separated positions.

As shown, the die shoe or platen 6 is equipped in the usual manner with a guide pin 8. A punch holder 10 is provided with a coacting bushing 12 which is desirably hardened and honed to provide full bearing on the standard pin 8.

As an extension below the bushing 12, I provide a supplemental or oiler extension bushing 14 which, in practice, has been made very slightly larger in cross section than the bushing. Whereas the bushing is 0.0005 larger in diameter than the pin 8, the bushing extension 14 is 0.003 larger. It will be understood that the figures given are by way of example and not by way of limitation.

It will be noted further that the interior surface 16 of the extension 14 has a beveled mouth at 18 which facilitates guiding the pin 8 into the aligned bushings.

In general, the extension bushing 14 is spool shaped, being provided on top and bottom with radially projecting flanges 20 and 22, respectively. At intervals, the flange 20 is cut away to receive the legs 24 of the annular wick 26 for which the top of bushing extension 14 is provided with a seat or shoulder 28.

The top and bottom flanges 20 and 22 of the spool-shaped extension 14 correspond in external diameter with the main bushing 12. A sleeve 30 pressed onto the bushing 12 and the extension 14 maintains the bushing components in aligned assembly and provides an outer wall 31 for a reservoir 32 into which oil may be inserted through a lubricating fitting 34, or otherwise. The annular wick 26 is confined between the bushing 14 and shoulder 28. The legs 24 of the wick dip into the reservoir 32 and transfer the oil by capillarity to the wick 26 which wipes the external surface of the pin 8 as it moves in the bushing sections.

The construction is not only effective in use but facilitates assembly and disassembly of the punch holder 10 from the platen or die shoe 6.

I claim:

1. In a die set having relatively reciprocable platens, the combination of a telescopically engageable and disengageable pin and bushing assembly, the pin being connected with one platen and the bushing with the other, the bushing assembly including a first bushing closely fitting the pin and a second bushing in which the pin has bearing engagement and which has a sleeve fixedly connecting it with the first bushing.

2. A combination according to claim 1 in which the second bushing has an inner cross section slightly exceeding that of the first bushing to facilitate guiding the pin into the first bushing.

3. A combination according to claim 1 in which the second bushing is spool shaped, having upper and lower flanges in pressed fit engagement with the sleeve and having an intervening space between said flanges constituting an oil reservoir for which the sleeve provides an outer wall, wick means being provided for withdrawing oil from the reservoir and delivering it to a pin reciprocating in the bushings.

4. A combination according to claim 3 in which one of said bushings is provided in its end with an annular seat, the wick means comprising a wick on said seat and confined by the other bushing and provided with leg means extending axially into the reservoir.

5. A combination according to claim 4 in which the wick has generally radial extensions constituting the leg means and the said one bushing has openings communicating axially between said seat and the reservoir and through which openings extend said leg means.

6. In a die set having relatively reciprocable platens, the combination of a telescopically engageable and disengageable pin and bushing assembly, the pin being connected with one of said platens and the bushing with the other, a second bushing comprising an oiler extension for said first-mentioned bushing and in which the pin is receivable, means for connecting the second bushing to the first-mentioned bushing, an annular wick confined between the second bushing and the first-mentioned bushing, and means for supplying lubricant to said wick.

7. A combination according to claim 6 in which the second bushing is spool shaped having axially spaced flanges, the means connecting the first-mentioned bushing and second bushing constituting a sleeve tightly engaged externally with the bushings and with said flanges and completing an oil reservoir between said flanges, one of said flanges having openings, said wick having leg means extending through the openings into the reservoir.

8. A combination according to claim 7 in which the spool-shaped second bushing has at one end an annular seat proximate to the first-mentioned bushing and in which said annular wick is disposed.

9. A combination according to claim 8 in which the end of said spool-shaped second bushing opposite said seat has a beveled mouth adapted to facilitate the entry of said pin, the interior cross section of said second bushing being slightly greater than that of the first-mentioned bushing.